Oct. 4, 1966   A. H. BURNER   3,276,354
APPARATUS FOR DRYING ELASTOMERIC MATERIALS
Filed Oct. 8, 1965   2 Sheets-Sheet 2
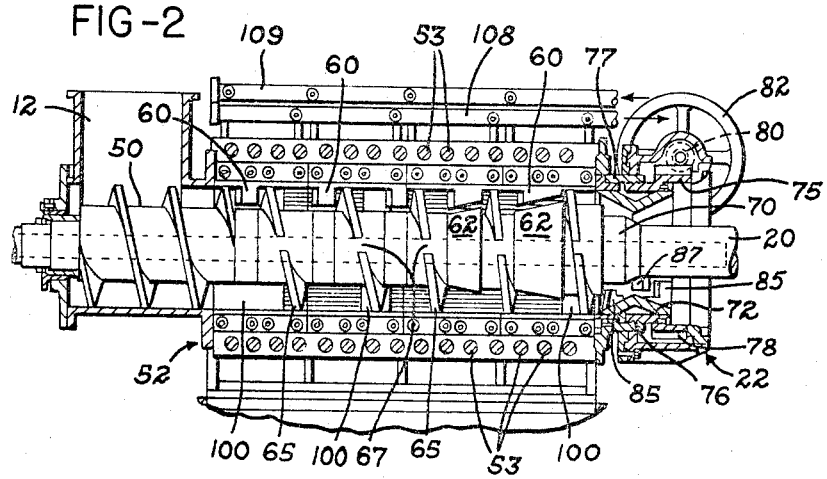
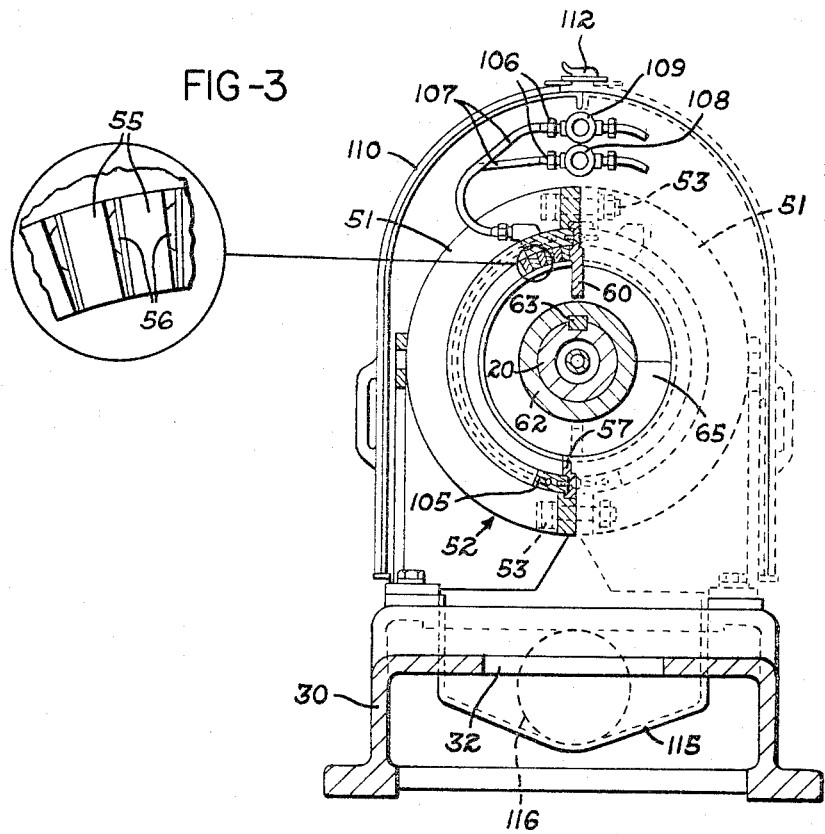

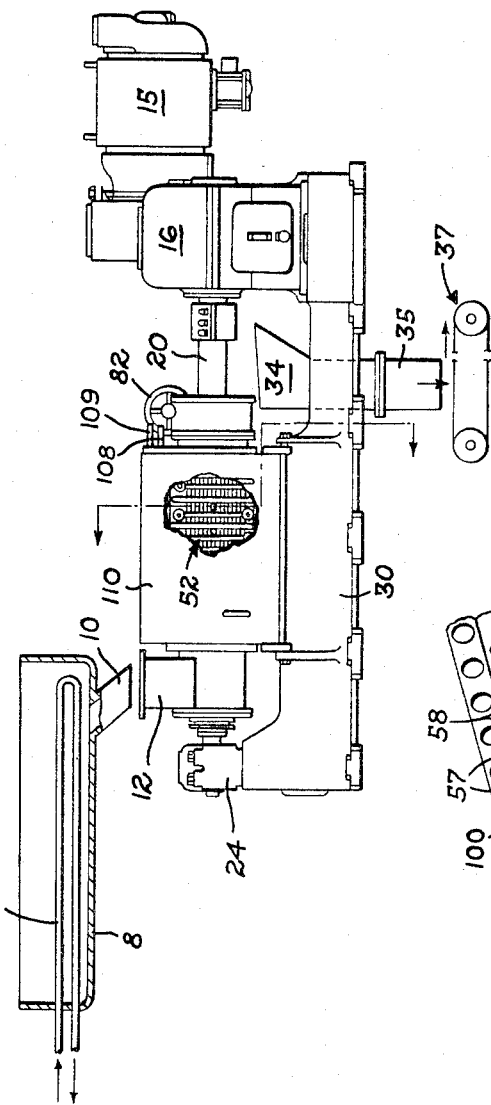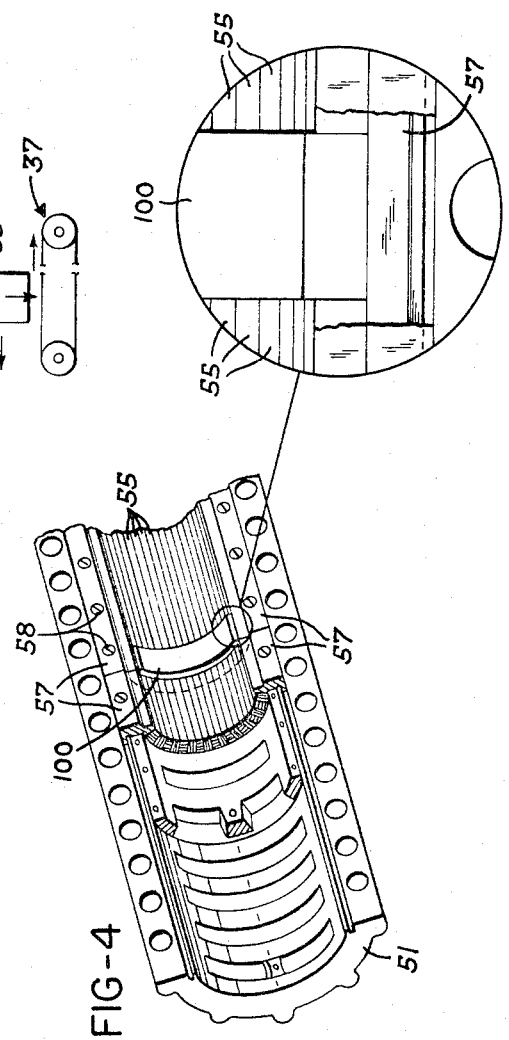

United States Patent Office 3,276,354
Patented Oct. 4, 1966

3,276,354
APPARATUS FOR DRYING ELASTOMERIC MATERIALS
Andre H. Burner, deceased, late of Piqua, Ohio, by Jean M. Burner, executrix, Piqua, Ohio, assignor to The French Oil Mill Machinery Company, Piqua, Ohio, a corporation of Ohio
Filed Oct. 8, 1965, Ser. No. 494,278
7 Claims. (Cl. 100—150)

This application is a continuation-in-part of copending application Serial No. 296,843, filed July 22, 1963, now Patent No. 3,225,453, granted December 28, 1965.

This application relates to apparatus wherein natural rubber or synthetic rubber materials or natural or synthetic elastomers of similar character, may be dewatered and/or dried thoroughly, such that the retained moisture of the end product is less than 1% by weight.

As specific examples of the utility of this invention, reference is made to the desirability to remove liquid from synthetic rubber materials for the purpose of obtaining an essentially dry crumb rubber product which can be compressed and baled for shipment and later use in manufacturing various articles. Similarly, it is desirable to remove liquid from natural rubber for the same purpose, so that an essentially dry natural rubber crumb product can be obtained for baling and shipment. With respect to the natural rubbers, this invention also is of particular significance in that great savings in processing time and labor may be realized.

In either event, however, the apparatus is of essentially the same character. Hence, the invention provides apparatus which is applicable to the drying of both natural and synthetic elastomeric materials.

As explained in the parent application, in the manufacture of synthetic rubber, the material is prepared by coagulating the synthetic latex or the like, and during this process the crumb rubber which is formed takes on a large amount of liquid. The free liquid is drained off as much as possible. The crumb is then dewatered to approximately 30 to 50 percent moisture whereupon it is fed into continuous hot air dryers to remove the moisture to commercial dryness which is understood to be a fraction of one percent residual moisture. In the case of synthetic rubber, there is much liquid to be removed, and the temperatures must be maintained below the point where the rubber would be damaged, therefore a long period of time is required for the drying operation and large dryers are necessary.

Heretofore, in the manufacture of natural rubber, the latex is coagulated in the field, then formed into slabs called coagulum which contains a substantial quantity of liquid. This liquid is partially removed by squeezing the coagulum between mill rolls, forming a sheet which is then hung up to air dry in sheds. Sometimes heated air is used, sometimes ambient air is used. In either case, the drying time takes from one week to four weeks, after which the rubber is cut into strips and formed into a bale for shipmnet.

As examples of the time required for effective drying according to presently used processes, an average drying time for synthetic rubber materials, for purposes of comparison with the present invention, may be assumed to be approximately sixty minutes, in order to produce the desired essentially fully dried product as mentioned previously. In the case of natural rubber, prolonged air drying takes from one to four weeks at present. Use of apparatus according to the present invention reduces the time to obtain an essentially completely dried product to a matter of a few minutes.

In accordance with the present invention the prepared rubber or other elastomer is subjected to heat, below the temperature which will damage the material, but sufficient to vaporize, or substantially to vaporize, liquid which is contained in relatively tiny pockets within the rubber. The rubber is simultaneously worked mechanically, by apparatus which tears, kneads, and otherwise manipulates the heated rubber to rupture the pockets containing liquid, providing for escape of such liquid in either the vapor or liquid state, and such vapor and/or liquid is separated from the material.

The mechanical working of the material is in most instances of sufficient magnitude to cause the required heating, although in some cases it may be feasible to heat the material first, adding sufficient heat to the material in the working step to aid in causing the liquid to be at least partially vaporized and thus ready to burst from the pockets in the material as these pockets are ruptured during the working step.

The working step is carried out as a continuous operation by feeding the material through a jacket or chamber which is of sufficient strength to maintain mechanical pressure on the material during the working, tearing and kneading thereof. This chamber is provided with drainage passages through which the feed liquid and/or vapor may flow to be removed from the material, and separated therefrom, with minimum amount of further contact between the solid and the liquid or vapor phase being removed. An additional benefit of flashing off the liquid as a vapor during the mechanical working and heating process, is that latent heat of vaporization removed from the rubber thereby cooling the rubber to prevent damage from excessive temperatures.

The mechanically dried material is conveyed out of the chamber, and, since it may tend to stick or coagulate in large balls or chunks, it may be subjected to a tearing step as it is discharged from the chamber to reduce the size of the chunks, and to impart to the material a porous character such that if further air drying is necessary, the material will give up its remaining moisture readily. If the material is essentially dry, then the porosity will facilitate quick cooling of the material to baling temperature. The material can then be baled and sold for use in further manufacture processes.

It has been found expedient in some cases to use extrusion through a variable orifice pelleting die or the like when processing natural latex in accordance with the invention to obtain an essentially completely dried natural rubber product. In such an instance the rubber is extruded through the die in a semi-plastic state and at a relatively high temperature, for example in the neighborhood of 300° F. Any retained liquid is, of course, in the vapor state, or will flash to the vapor state as soon as the pieces of material pass through the die, and mechanical pressure is released. The material coming from the die has been observed to burst under the effect of any releasing vapor in such an instance, leaving a honey-comb effect in the resultant product.

Two pressing devices of the type disclosed herein can be connected in series. In some instances it may be desirable to have apparatus connected between these two devices to receive the dewatered or "lower moisture content" material from the first press and to reduce the size and to tear apart the material issuing from the first press, and then to follow up with a second pressing operation on the material involving heating and simultaneously tearing, kneading, and otherwise mixing the material. A suitable such device is disclosed in copending application Serial No. 410,458, filed November 12, 1964. It is also possible to maintain a better control of the process by using two presses in series, since the pressure midway in the dewatering and drying process can be controlled independently of the final pressure. In any event, by performing a substantial proportion of the drying operation in a mechanical fashion, which is inherently more economical than thermal drying (i.e., by hot air), it is possible to obtain significant economies in the drying of the different types of rubber previously mentioned.

Accordingly, the primary object of this invention is to provide a novel apparatus in which natural or synthetic elastomeric materials and the like can be dried in a continuous process and in a more economical and more rapid manner than has heretofore been possible.

A further object of the invention is to provide novel screw press apparatus wherein heating and the working steps are performed essentially simultaneously upon rubber materials, and wherein provision is made for separation and escape of the vapor and/or liquid so released, from the solids of the material being worked, thereby minimizing the tendency of the rubber to retain the released liquids, and reducing the necessary temperatures.

Another important object of this invention is to provide a novel screw press for working and drying materials such as rubber, including bearing constructions to assist in maintaining the screw member in properly aligned position, thereby minimizing fatigue of the parts, particularly the main shaft and its mounting bearings.

Another object of the invention is to provide, in a screw press for dewatering or drying rubber materials, one or more bushing members which have a normal running clearance with the pressure worm structure, and which provide a bearing surface that can be engaged with a screw flight while it is rotated to limit deflection of the pressure worm and shaft assembly.

Additional objects and advantages of the invention will be apparent from the following description, the accompanying drawings and the appended claims.

In the drawings:

FIG. 1 is a side elevational view of the overall arrangement of an expressing and drying apparatus as provided by the invention, with a fragment of the casing broken out to show the general exterior of the cage structure;

FIG. 2 is a sectional view, on an enlarged scale, showing the features of the interior construction of the expression cage and associated parts;

FIG. 3 is an enlarged cross-sectional view, taken essentially through the center of the expression cage, showing the manner in which the worm flights run normally with close clearance to the surrounding bushings, and also including an enlarged detail showing the drainage spacers; and FIG. 4 is a perspective detail view, with some parts broken away, showing one half of the cage assembly.

It will be understood that the drying process of the present invention is applicable to many different types of rubber materials. As examples of such material, reference is made to the butadiene-acrylonitrile elastomers. In the manufacture of such synthetic rubbers, which is accomplished by emulsion polymerization of butadiene and other materials, for example styrene in the case of manufacturing synthetic rubber known as GR-S rubbers, the synthetic liquid latex is coagulated and washed in water, and then must be dried before it can be baled and used.

Following the polymerization and washing process, the synthetic rubber is in the form of wet, relatively small chunks, in the nature of a curd. This mass of wet crumb rubber is passed over a vibrating screen, or through some equivalent apparatus, where the surface liquid is drained off, and the wet crumb rubber is then subjected to the drying process. In the past, this has been accomplished by passing the material through a vacuum drum filter, which apparatus may be capable of reducing the liquid content of the rubber crumb to around 30%, after which this still relatively wet crumb rubber is passed to a so-called tunnel drier in which hot air is circulated to remove the rest of the liquid. In another process previously used, squeeze rolls have been employed, instead of the vacuum drum filter, and again the moisture content is reduced only to about 30% after which the relatively wet synthetic crumb rubber is passed to the drier. Also, the wet crumb rubber has been extruded in pellet form, having substantially less than 30% moisture, but these pellets, due to lack of porosity, give up their retained moisture only with considerable difficulty in a tunnel dryer.

The invention also applies to the drying of natural latex or natural rubber which is prepared as a crumb material and dried. In many respects the natural rubber is similar to and can be handled in the same manner as the synthetic rubber, but there are certain differences as will be explained hereafter.

According to the present invention, it will be assumed that the wet synthetic rubber, as it would be supplied to such vacuum filter or squeeze rolls, is introduced into a tank 8, having a heater coil 9, and then discharges to the chute 10, FIG. 1, and passes into the feed hopper or chamber 12 of a novel mechanical drying apparatus, in the general form of an interrupted-flight high pressure screw press. This apparatus is driven by a motor, such as electric motor 15, which is coupled through a gear reduction unit 16, to the main shaft 20 of the screw press. This shaft, as shown particularly in FIG. 3, extends from the discharge ring 22 through the entire press unit, including the bottom of the inlet hopper or chamber 12, and passes therefrom through a support bearing 24.

The entire press unit is mounted upon a base 30 (FIG. 1), including also the gear reduction unit 16 and the drive motor. This base may be provided with a central opening 32, seen particularly in FIG. 3, and a receiving hopper 34 and a discharge chute 35 serve to conduct the dried synthetic rubber crumb to a conveyor 37, whereby the dried crumb rubber is carried away from the press.

FIGS. 2 and 3 show details of the novel expressing apparatus by means of which the present process is performed. The shaft 20 carries a feed worm 50 which takes up and compacts the wet rubber material supplied into the feed chamber 12. The compacted material is carried by feed worm 50 into the main expression chamber, which is shown in the form of a split cage unit 52 having a plurality of relatively large drainage openings in the sides thereof. This cage unit is suitably supported on the base 30.

When the cage is assembled, the cage sections 51 are securely fastened together by bolt and nut fasteners 53, two of which are shown in dotted lines in FIG. 3. Further of the bolts 53 are shown in section in FIG. 2. Parts of the interiors of the cage sections are lined with screen bars 55 (FIG. 3) which preferably extend longitudinally of the cage, and which are spaced slightly apart by suitable spacer members 56 forming drainage openings between adjacent screen bars. These drainage openings extend lengthwise of the cage, and each opening is of relatively small cross-section with respect to the large drainage openings formed in the cage sections. Therefore, the drainage openings will permit the passage of liquids or vapors from the cage, but solids being compressed and worked within the cage will be contained therein.

Each cage section is provided with a center bar 57 at its top and bottom, and these center bars serve to retain the screen bars in the sections, being in turn bolted to the sections by a plurality of retainer bolts 58. Certain of the center bars are provided with inward extending lugs 60, preferably having a beveled edge facing the inlet end of the cage. These lugs 60, generally referred to as breaker lugs, serve to engage the material being forced toward them by the worm flights, and to prevent rotation of the material along the extent of their length axially of the cage, causing the material to be fed toward the discharge end. Thus, in the areas within the cage corresponding to the breaker lugs 60, shaft 20 is surrounded by collars 62. Some of these collars may be of uniform cross-section along their length while others may be formed to increase in cross-section toward the discharge end of the cage, thus forming with the cage walls a passage of decreasing cross-section through which the material is forced, resulting in mechanical compaction and compression of the material.

Between the collars 62, surrounding the shaft and driven therefrom through a key 63 (FIG. 3) are worm members 65 which take up the material passing from the preceding collar, and force the material over the following collar. These worm members preferably, although not necessarily, are provided with notches 67 in the worm flights. This notched worm construction serves to enhance the mechanical working of the material as it passes through the cage.

The material forced toward the discharge end by the last worm 65 is passed over the discharge sleeve 70 which cooperates with the discharge cone 72 to form an annular discharge orifice. Thus, the material is worked and compressed, as it passes through the expression cage, toward such discharge opening, and the back pressure upon the material may be controlled by varying the size of the discharge opening. This is accomplished by mounting the discharge cone 72 upon a control ring 75 which is threaded at 76 to a stationary ring 77 on the end of the cage. Ring 75 is formed with gear teeth 78, constituting a pinion which remains in mesh with worm 80 through its range of movement parallel to shaft 20. The worm is controlled by a hand wheel 82 which provides a means for varying the position of discharge cone 72, and thus controlling the cross-sectional area of the discharge opening. The discharge ring 22 is in turn mounted on the ring 75, as shown in FIG. 2.

The discharge cone 72 carries spaced apart inwardly extending lugs 85, and at least one rotating lug 87 is mounted to rotate with shaft 20, either at or beyond the discharge collar 70, and cooperates with the stationary lugs 85 to tear the material passing from the apparatus. In addition, rotating shredder blades can be provided at the discharge, as explained in said application Serial No. 410,458. The stationary lugs 85 are spaced sufficiently to provide for adjustment movement of the discharge cone, thereby avoiding interference of these lugs with the rotating lug 87.

At several locations in the cage, around one or more of the worm members 65, there are bushings 100, preferably formed in two pieces, which have an outer diameter to fit within the cage sections. The sections of the bushings can thus be held in place by the center bars 57, but the edges of the bushing parts can overlap the center bars to present a continuous annular surface. The screen bars 55 are arranged to extend from the edges of the bushings as shown in FIG. 4, so there is no drainage in the areas where bushings are fitted. It has been found, however, that this does not interfere with the operation of the press.

The inner diameter of the bushings 100 is preferably a few thousandths of an inch greater than the outer diameter of the worm flights which they surround. Normally this spacing remains as running clearance. If some force occurs causing the shaft to deflect, the worm flight affected can run in contact with the annular inner surface of its related bushing, thereby minimizing shaft deflection and consequent wear on the end bearings which support the shaft. The bushings 100, or selected ones of them, can be hardened if desired, depending upon conditions expected during operation of the press.

The cage sections may be provided with internal passages 105 (FIG. 3), terminating in fittings 106 to which may be coupled flexible hose sections 107, as shown particularly in FIG. 5. These flexible hoses can be connected to an inlet manifold 108 through which a heating fluid such as steam may be introduced if desired, and an exhaust manifold 109 through which the fluid may be carried away from the apparatus.

The cage itself is covered by an outer enclosure 110 of two complementary pieces which are joined at the top by a conventional latch 112. Beneath the cage there is a collection pan 115 for the expressed liquids, and this pan opens into a suitable discharge 116 through which liquids and/or vapors may escape once they have been separated from the material and passed through the drainage openings of the cage to its exterior.

If for any reason the drainage openings between the screen bars should become fouled or clogged, or if the parts of the apparatus within the cage should require maintenance for any other reason, it is possible to gain access to the interior of the cage with relative ease by removing the bolts 53 and opening the split cage. The bushings 100 can be removed by disconnecting the drive connection to shaft 20, and moving the bushings along the shaft to this location. Of course, in such operation the steam supply and exhaust lines, if used, may be uncoupled if necessary.

In operation of the apparatus, the wet rubber material is supplied to the feed hopper or chamber 12, and the feed worm 50 picks up this wet material and advances it into the main drying and extraction chamber, where it is subjected to mechanical pressure while it is simultaneously worked by the action of the notched worms 65 and the breaker bars or lugs 60, thus mechanically working, kneading, and tearing the compacted material while it is simultaneously heated by friction, and through transfer of the heat from the steam to the cage and the screen bars 55, if desired.

The material in the chamber can be heated to in excess of 212° F., but the temperature is maintained below the temperature at which the particular type of rubber is damaged. Of course, this maximum temperature may vary with different types of rubber materials being processed. The moisture encapsulated or contained within pockets of the rubber material is therefore heated to a temperature where all (or substantially all) of the moisture is vaporized, and this apparently builds up an internal pressure in such moisture pockets which promotes the rupture thereof when the pockets are torn by the mechanical working of the material. The vapor thus released, and liquid if any of such is present, is readily removed immediately from the solid material by reason of the venting or drainage passages between the screen bars.

With natural rubber materials the wet natural rubber may be available as slabs or sheets, sometimes referred to as coagulum, which are in essence coagulated natural latex. The invention also encompasses the drying of so-called scrap rubber, which is the natural latex scraped from the trees or from the ground where it may have fallen in the plantation or collected in latex collecting cups. In either event, the natural rubber is run through a hammermill or some equivalent shredding apparatus to reduce the slabs to particles to feed to the apparatus, and this material is then supplied to the feed hopper 12.

In either event, the wet rubber material can be dewatered in a first working and heating apparatus of the type shown in FIGS. 1–3. In this apparatus, for example, liquid may be removed down to approximately 15% retained liquid. The relatively dry rubber material then can be passed through a shredder to reduce the size of the chunks suitable to feed to the next apparatus, which may be another press of the same general construction disclosed herein.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for mechanically dewatering rubber material, comprising wall means defining an elongated cylindrical expression chamber having an inlet at one end and an outlet at the other end thereof and a plurality of drainage openings through the walls thereof distributed around the periphery of the chamber for substantially surrounding the rubber material with drainage openings through which fluids removed from the rubber material are immediately conducted away from such material, a shaft extending through said chamber having a plurality of working and conveying worms mounted at spaced locations therealong, bearings supporting said shaft to extend concentrically through said chamber, said worms including a worm body having a substantially smaller diameter than the interior of said chamber and having worm flights extending outwardly from said worm bodies, collar members mounted on said shaft between said worm members, at least some of said collar members tapering outwardly from the preceding worm body to a greater diameter than said preceding worm body, breaker lugs extending from said wall means toward said collar members, drive means connected to rotate said shaft for conveying rubber material through said chamber, said worms and said collar members and said lugs cooperating to work the rubber material for rupturing pockets therein to release fluids encapsulated in such pockets while simultaneously exerting mechanical pressure on the material, at least one bushing mounted in said chamber surrounding at least one of said worm bodies and presenting an annular surface normally in closely spaced relation to the periphery of the adjacent worm flight to provide a surface against which such flight can bear in the event of deflection of said shaft due to load conditions imposed on the shaft tending to move it out of concentric position.

2. Apparatus as defined in claim 1 wherein at least some of said worm flights comprise spaced worm flight segments defining notch-like spaces therebetween for working of the material as it is advanced by said flight segments toward said chamber outlet, and wherein the periphery of said segments is adapted to bear against the interior surface of the surrounding bushing.

3. Apparatus as defined in claim 1 wherein said annular surfaces at the interior of said bushings are hardened to resist wear due to temporary bearing of the worm flights on such annular surfaces.

4. Apparatus as defined in claim 1 wherein bushings are located in said chamber adjacent to said inlet and to said outlet in proximity to said bearings.

5. Apparatus as defined in claim 4 wherein additional bushings are provided closer to the center of said chamber where greater deflections of said shaft are possible.

6. Apparatus for mechanically dewatering rubber material, comprising a plurality of screen bars mounted in side-by-side relation forming a wall means defining an elongated cylindrical expression chamber with an inlet at one end and an outlet at the other end thereof, spacers between at least some of said screen bars forming a plurality of drainage openings around the periphery of the chamber through which fluids removed from the rubber material are immediately conducted away from such material, a rotatable shaft extending through said chamber having a plurality of working and conveying worms mounted at spaced locations therealong, bearings outside of said chamber supporting said shaft to extend concentrically through said chamber, said worms including a worm body having a substantially smaller diameter than the interior of said chamber and having worm flights extending outwardly from said worm bodies, collar members mounted on said shaft between said worm members, breaker lugs extending from said wall means toward said collar members, drive means connected to rotate said shaft causing said worm flights to convey rubber material through said chamber and to work the rubber material therein to release fluids encapsulated in the material while simultaneously exerting mechanical pressure on the material, bushings mounted in said chamber surrounding certain of said worm bodies and presenting an annular surface normally in closely spaced relation to the periphery of each worm flight adjacent to a bushing to provide a surface against which such flight can bear during deflection of said shaft due to load conditions imposed on the shaft in the region of such bushing.

7. Apparatus for mechanically dewatering rubber material, comprising a cage structure and a plurality of annular bushings supported in spaced relation in said cage structure, screen bars extending longitudinally of said cage structure in side-by-side relation to form wall means defining an elongated cylindrical expression chamber having an inlet at one end and an outlet at the other end thereof, spacers between said screen bars forming a plurality of drainage openings around the periphery of the chamber for substantially surrounding the rubber material with drainage openings through which fluids removed from the rubber material are immediately conducted away from such material, a shaft extending through said chamber having a plurality of working and conveying worms mounted at spaced locations therealong, bearings outside said chamber supporting said shaft to extend concentrically through said chamber, said worms including a worm body connected to rotate with said shaft and having a substantially smaller diameter than the interior of said chamber and having worm flights extending outwardly from said worm bodies, at least some of said flights extending into closely spaced relation with said bushings, collar members on said shaft between said worm members, breaker lugs extending from said wall means toward said collar members, drive means connected to rotate said shaft for conveying rubber material through said chamber, said worms and said collar members and said lugs cooperatnig to work the rubber material to release fluids while simultaneously exerting mechanical pressure on the material, and said bushings presenting an annular surface normally in closely spaced relation to the periphery of the adjacent worm flight against which such flight can bear in the event of deflection of said shaft due to load conditions imposed on the shaft tending to move it out of concentric position.

References Cited by the Examiner

UNITED STATES PATENTS

| | | | |
|---|---|---|---|
| 742,971 | 11/1903 | Cummer | 101—45 |
| 1,733,381 | 10/1929 | Meakin | 100—150 X |
| 1,766,031 | 6/1930 | Meakin | 100—148 X |
| 2,320,765 | 6/1943 | Upton | 100—129 X |

FOREIGN PATENTS 3,093,065  6/1963  France.

LOUIS O. MAASSEL, *Primary Examiner.*